United States Patent [19]  [11] Patent Number: 4,783,591
Sullivan  [45] Date of Patent: Nov. 8, 1988

[54] COLOR MARK SENSOR

[75] Inventor: Charles T. Sullivan, Burnsville, Minn.

[73] Assignee: Honeywell Inc., Minneapolis, Minn.

[21] Appl. No.: 118,586

[22] Filed: Nov. 9, 1987

[51] Int. Cl.⁴ .............................................. G06K 7/015
[52] U.S. Cl. .................................. 250/227; 250/226; 250/557
[58] Field of Search ............. 250/227, 226, 557, 561, 250/223 R; 356/425

[56] References Cited

U.S. PATENT DOCUMENTS 3,185,021 5/1965 Thompson .
3,784,832 1/1974 Sewell .
3,867,039 2/1975 Nelson .
4,068,734 1/1978 Foeller .
4,379,636 4/1983 Yoshida .
4,624,571 11/1986 Salda et al. .
4,649,271 3/1987 Hok et al. .......................... 250/227
4,687,925 8/1987 Huggins .......................... 250/223 R Primary Examiner—Edward P. Westin
Assistant Examiner—Khaled Shami
Attorney, Agent, or Firm—Omund R. Dahle

[57] ABSTRACT

A color mark sensor utilizing the cumulative chromatic aberration in an extended planar gradient-index (GRIN) lens to provide unambiguous primary color separation in a continuum along the lens axis. An appropriately chosen GRIN lens length provides separation and focus of any primary color from the general polychromatic background.

7 Claims, 1 Drawing Sheet

COLOR MARK SENSOR

BACKGROUND AND SUMMARY OF THE INVENTION

Color mark detection is often required in manufacturing and packaging operations which monitor continuous products, such as monitoring lengths of paper/plastic material to be packaged on a roll. Mark detection requires differentiation of a colored mark from the colored background, and often only a few colors need to be recognized. This invention provides fast, single primary color recognition at low cost.

Chromatic aberration is a property of lenses which causes the various pure colors in a beam of polychromatic light to be focussed at different points due to the fact that the substance used for the lens refracts light of different pure colors by different amounts. In optical devices such as cameras, binoculars and the like, chromatic aberration is very undesirable and unwanted, and steps are taken to overcome or minimize the effect, for example by using achromatic lenses. In the present invention, by contrast, the chromatic aberration occurring in a gradient-index (GRIN) rod lens (sometimes known as a Selfoc lens) is desired. A key concept is the use of a cumulative chromatic aberration in an extended GRIN lens element to obtain primary color separation. The planar GRIN lens described herein provides substantial chromatic aberration and is readily obtained by lapping a conventional rod GRIN lens and terminating the length of the lens at the focal point plane of the desired primary color.

DESCRIPTION

Figure 1:
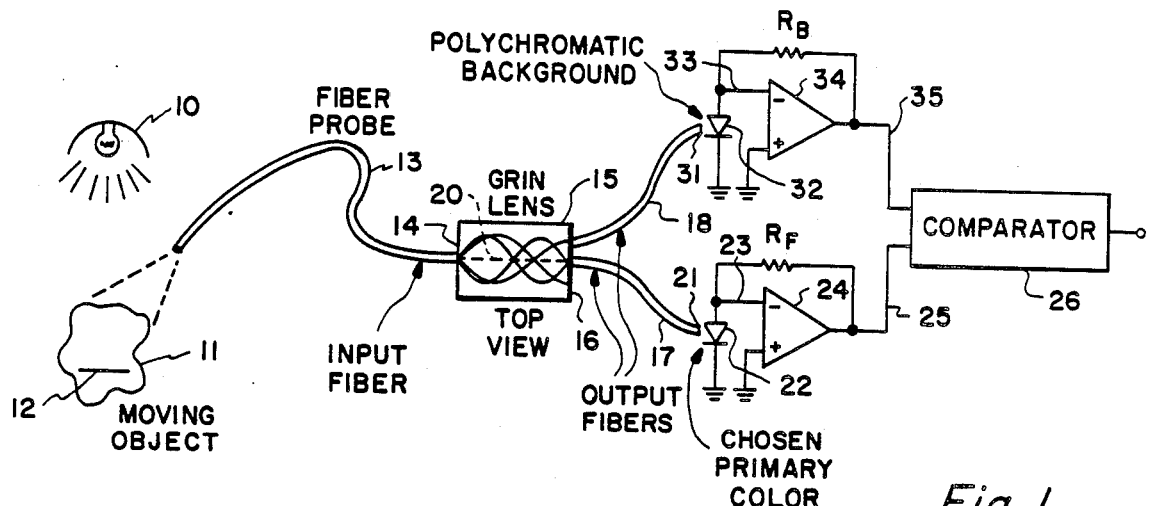
FIG. 1 is a schematic diagram of an embodiment of the invention.
Figure 1A:
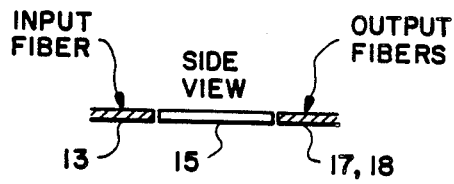
FIG. 1a is a side view of a portion of FIG. 1.

Referring now to FIG. 1 there is shown an illumination source or lamp 10 for properly illuminating an object 11 to be observed. Object 11 may be, for example, a length of a continuous moving product such as paper or plastic material to be subsequently packaged on a roll, not shown. The object 11 may have a periodic mark 12 of a designated color (such as red) placed thereon which colored mark is of a contrasting color with the background color of the object 11. Diffusely reflected or transmitted polychromatic light from the illuminated object 11 is collected by a fiber optic probe 13 that routes the light signal to the input 14 of a gradient-index rod (GRIN) lens 15, a schematic top view of which is shown in FIG. 1. In the preferred embodiment a conventional rod GRIN lens has been lapped top and bottom to form a planar lens. FIG. 1a shows an edge view or side view and when compared with FIG. 1 top view it can be seen that the lapping has removed the top and bottom of the original GRIN rod lens shape to provide the planar GRIN shape. Alternatively, a planar GRIN lens can be formed using techniques similar to those utilized in forming conventional rod GRIN lenses. At the output face 16 of the GRIN lens 15 are shown two output fibers 17 and 18. The output fiber 17 located on the lens axis 20 collects the chosen primary color. The output fiber 18 is located off-axis and collects a sample of the polychromatic background color. The output end 21 of the output fiber 17 has positioned thereat a photodetector 22 to receive the chosen primary color emanating from fiber 17. The electrical signal from photodetector 22 is connected 23 to amplifier 24, the output lead 25 of which is further connected to one input of a comparator 26. Similarly, the output end 31 of the output fiber 18 has positioned thereat a photodetector 32 to receive the polychromatic background light emanating from fiber 18. The electrical signal from photodetector 32 is connected 33 to amplifier 34, the output lead 35 of which is connected to a second input of the comparator 26.

Referring again to the planar GRIN lens 15, the key concept is the use of cumulative chromatic aberration in an extended lens element to obtain primary color separation. Primary color is here defined as any elemental color in the spectrum of pure colors. The planar gradient-index lens provides substantial chromatic aberration and is readily formed by lapping a conventional rod GRIN lens. Simple ray tracing shows that chromatic dispersion in a GRIN lens of sufficient length provides unambiguous primary color separation (blue, green, red) in a continuum along the lens axis 20. An appropriately chosen GRIN lens length provides separation and focus of any primary color from the general polychromatic background.

Figure 2:
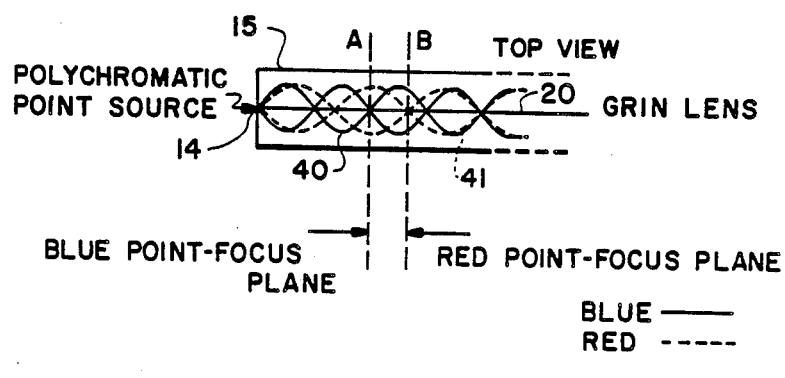
FIG. 2 shows information of the gradientindex lens, shown in FIG. 1.
Figure 3:
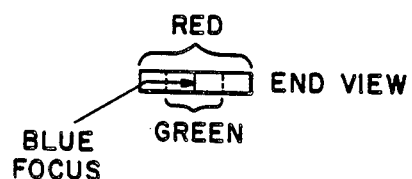
FIG. 3 shows an end view of the gradientindex lens of FIG. 2 cut at plane A.

FIG. 2 is another top view of the planar GRIN lens 15 and shows extending from the polychromatic point source at input 14 a pure blue ray trace (solid line curve) 40 and a pure red ray trace (dotted line curve) 41. Plane A and plane B show the blue point-focus plane and the red point-focus plane provide separation and focus of the primaries blue and red, respectively. FIG. 3 shows an end view of FIG. 2 as cut at plane A where the blue is at focus. An output fiber or photodetector located on the lens axis 20 collects or detects the chosen primary color (in this example the blue) and an off axis fiber collects a sample of the background color. Comparison and thresholding of the primary and background signals determines the presence or absence of a colored mark, in this example of a blue mark. If the GRIN lens had been cut at plane B (the red point-focus plane) the presence of a red mark could be determined. If desired red, green and blue versions can be configured in parallel for simple low-cost RGB trichromatic color detection.

The embodiments of the invention in which an exclusive property or right is claimed are defined as follows:

1. A color mark sensor for detecting the presence of a color mark on an object being observed, the color mark sensor system comprising:

optical path means having an input positioned to view an object to be observed and transmit polychromic light received therefrom to a path means output, the light emanating from said output as a polychromatic point source;

a planar gradient-index (GRIN) lens having an optical axis and an input face connected and axially aligned with said point source to receive said polychromatic point source of light, said planar GRIN lens being sufficiently extended in length whereby its cumulative chromatic aberration obtains primary color separation at an output face, said GRIN lens being terminated in length at the focal point plane of the chosen primary color to be sensed, the chosen primary color emanating from the output face at said axis and background color emanating elsewhere on said face;

first means including photodetector means positioned for receiving chosen primary color light form said GRIN lens output face and providing an output signal indicative thereof;

second means including photodetector means positioned for receiving background color light from said GRIN lens output face and providing an output signal indicative thereof;

and comparator means receiving the signals from said first and second means.

2. The system according to claim 1 in which said optical path means is a fiber optic medium.

3. The system according to claim 1 in which said planar GRIN lens is formed from a gradient-index rod lens which has been lapped top and bottom to remove a substantial amount of the upper and lower portions of said rod lens.

4. A color mark sensor for detecting the presence of a primary color mark on an object of a different background color, the color mark sensor system comprising:

an optical fiber means having an input end and an output end, said input end positioned to view an object to be observed and transmit polychromic light received therefrom to said output end, the light emanating from said output end as a polychromatic point source;

a planar gradient-index (GRIN) lens having a linear optical axis, an input face and an output face, said input face connected and axially aligned with said point source to receive said polychromatic point source of light, said planar GRIN lens being sufficiently extended in length whereby the inherent cumulative chromatic aberration therein obtains primary color separation at said output face, said GRIN lens being terminated in length at the focal point plane of the chosen primary color to be sensed, the chosen primary color emanating from the output face at said axis and background color emanating elsewhere on said face;

first receiving means including photodetector means positioned for receiving chosen primary color light from said GRIN lens output face and providing an output signal indicative thereof;

second receiving means including photodetector means positioned for receiving background color light from said GRIN lens output face and providing an output signal indicative thereof;

and comparator means receiving the signals from said first and second receiving means.

5. The system according to claim 4 in which said planar GRIN lens is formed from a gradient-index rod lens which has been lapped top and bottom to remove a substantial amount of the upper and lower portions of said rod lens.

6. The system according to claim 5 in which the first receiving means further includes a second optical fiber optically interconnecting said photodetector means to said GRIN lens output face at said axis, and in which the second receiving means further includes a third optical fiber optically interconnecting said photodetector means and another location on said GRIN lens output face.

7. The system according to claim 1 in which the first receiving means further includes a second optical fiber optically interconnecting said photodetector means to said GRIN lens output face at said axis, and in which the second receiving means further includes a third optical fiber optically interconnecting said photodetector means and another location on said GRIN lens output face.

* * * * *